Nov. 25, 1952  P. L. HANSON  2,619,367
RELEASABLE VALVED COUPLING
Filed May 19, 1949

Inventor:
PAUL L. HANSON
BY
ATTORNEY

Patented Nov. 25, 1952

2,619,367

UNITED STATES PATENT OFFICE 2,619,367

RELEASABLE VALVED COUPLING

Paul L. Hanson, Waterloo, Iowa, assignor to Deere Manufacturing Co., Dubuque, Iowa, a corporation of Iowa Application May 19, 1949, Serial No. 94,088

4 Claims. (Cl. 284—17)

This invention relates to a fluid-pressure system and more particularly to a valve coupling. Still more particularly, the invention relates to a coupling for interconnecting a fluid-conducting conduit to a fluid-pressure-distributing casing or the like, the coupling including a valve which automatically closes when the coupling is disconnected from the casing.

In the agricultural field, it is common to provide a vehicle-drawn implement with a fluid-pressure motor for adjusting an implement part, the motor deriving power from a fluid-pressure source on the vehicle. The transmission of fluid pressure from the source to the motor is accomplished by one or more hoses or equivalent flexible conduits connected to the distributing valve of the pressure source by couplings in which provision is made for release of the couplings from the distributing valve when the implement and tractor become disconnected, particularly when such disconnection occurs inadvertently, as when the hitch pin breaks or becomes dislodged, or as in the case of special releasable hitches providing for disconnection of the implement or other trailing vehicle while the tractor may continue forwardly. A similar condition would arise in the event that the operator connected the hoses but neglected to connect the hitch.

Ordinarily, disconnection of the coupling results in the loss of fluid from the hoses. According to the present invention, it is an important object to provide a check valve or its equivalent in such hose or hoses so that the coupling is immediately closed against the escape of fluid. It is a further and none the less important object to provide a check valve which may be readily unseated by reconnection of the coupling to the distributing valve casing. A still further important object is to provide a coupling in which fluid presure may be utilized to assist the reconnection.

Other important objects of the invention are to provide: An improved coupling which is simple in construction and economical to manufacture; a coupling which may be readily adapted to an existing type of fluid-pressure system; and a coupling that can be easily manipulated and one that will be trouble free in operation.

The foregoing and other important objects and desirable features inherent in and encompassed by the invention will become apparent to those versed in the art as a complete disclosure is made of a preferred form of the invention in the following detailed description and accompanying sheet of drawings, in which.

Figure 1:
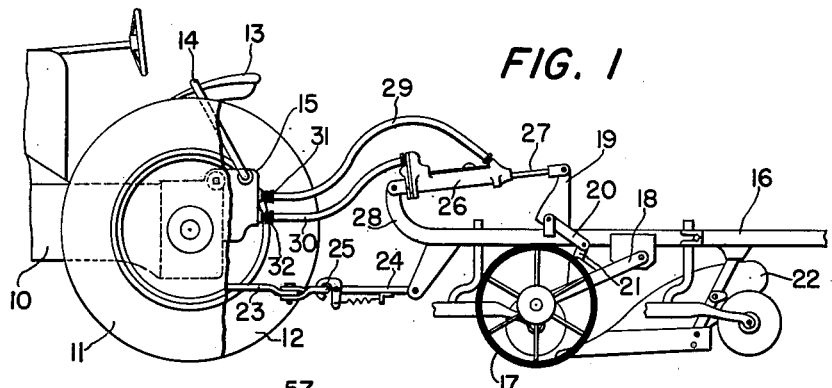
Figure 1 is a side elevational view of the rear portion of a tractor to which is connected a plow, the view showing generally a typical vehicle-drawn implement in which a fluid-pressure system is utilized.

The background arrangement chosen for the purposes of illustrating the fluid-pressure system and the invention as applied thereto is an agricultural implement unit comprising a vehicle in the form of a tractor having a body 10 carried on wheels including rear traction wheels 11 and 12. The rear portion of the tractor body carries an operator's seat 13 and convenient thereto is an operating lever 14 for controlling distributing valve mechanism (not shown) contained within a fluid-pressure system casing 15. The valve mechanism has not been illustrated, since it may be of any conventional construction and forms no particular part of the present invention.

The implement illustrated is a plow and comprises a frame 16 which is supported on a wheel 17 by means of a cranked axle 18. A bell crank is pivoted on the frame 16 and includes first and second arms 19 and 20, the latter of which is connected by a link 21 to the cranked axle 18. Rocking of the bell crank 19—20 about its pivot on the frame 16 in a clockwise direction operates through the link 21 to exert a downward force on the wheel 17 to raise the frame 16 and a plow bottom 22 carried by the frame. Rocking of the bell crank in the opposite direction results in lowering of the frame and plow bottom to working position.

The plow is drawn by the tractor by hitch means including a tractor drawbar 23, a draft member 24 carried by the plow, and a releasable connection 25. This connection may be of any conventional construction providing for overload release of the plow from the tractor, as occasioned by a condition in which the plow encounters an obstacle of a certain magnitude.

The power adjustment or raising and lowering of the frame 16 and plow bottom 22 is accomplished by fluid pressure delivered to a fluid-pressure-receivable device or motor here in the form of a cylinder 26 from which extends a piston rod 27. The cylinder is anchored at one end to a frame extension 28 on the plow and the piston rod is connected at its free end to the arm 19 of the bell crank. The cylinder or motor illustrated is of the two-way type and fluid pressure from the casing 15 is supplied and returned through a pair of flexible fluid conduits such as hoses 29 and 30. That is, transmission of fluid under pressure from the casing 15 through the hose 30 to the anchored end of the cylinder 26 will result in extending of the piston and consequently raising of the plow frame 16 and plow bottom 22; and fluid exhausted from the opposite end of the cylinder 26 will return via the hose 29 to the casing 15. A reverse effect will occur when the control lever 14 is actuated to cause the cylinder and piston to lower the plow frame 16 and plow bottom 22.

The hoses 29 and 30 are fixed by threaded connections to opposite ends of the cylinder 26. The other ends of the hoses are connected to the casing 15 by couplings or connectors 31 and 32, respectively. The details of one of these couplings and its relationship to the casing 15 will be enlarged upon in Figures 2, 3 and 4, it being understood that both couplings are identical and that what is said about one applies equally to the other.

Figure 2:
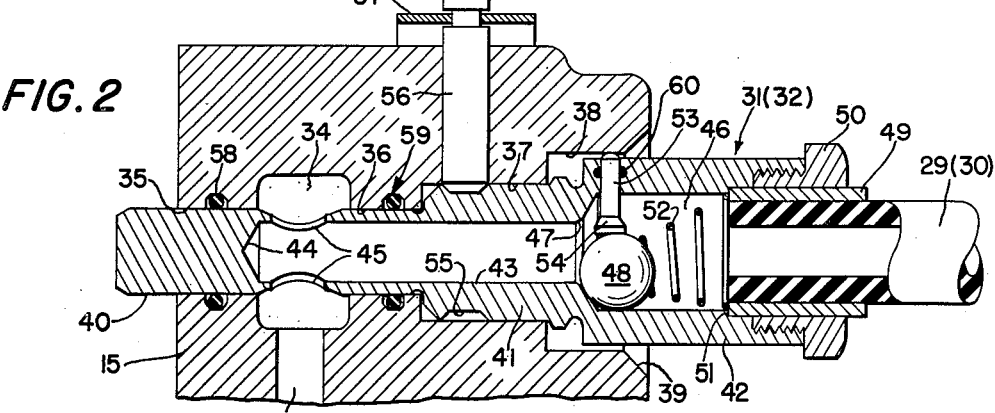
Figure 2 is an enlarged fragmentary sectional view illustrating the relationship between the distributing valve casing and the coupling, this view illustrating the coupling in its received or inserted position.
Figure 3:
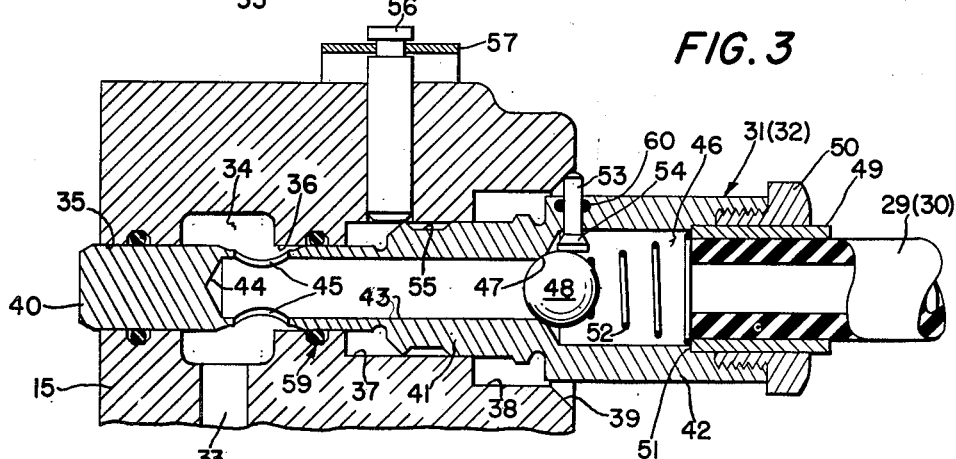
Figure 3 is a sectional view similar to Figure 2, but showing the coupling in position immediately prior to complete insertion in the casing.
Figure 4:
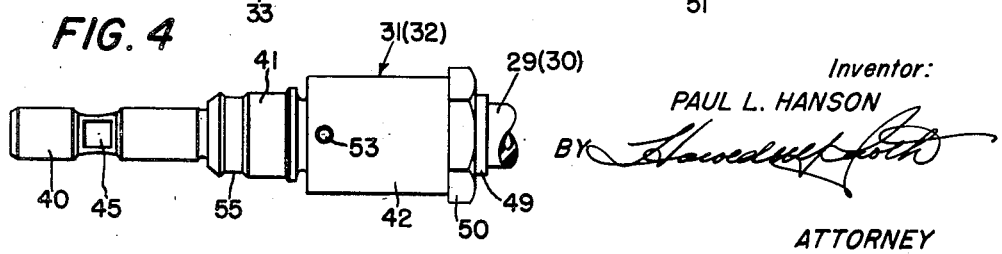
Figure 4 is a plan elevational view of the coupling, drawn to a smaller scale, and illustrating the external appearance thereof.

As best shown in Figures 2 and 3, the casing 15 is a first connector means and has a high-pressure passage 33 which terminates in a relatively enlarged chamber 34. The casing is cored or otherwise provided with a bore or passage at right angles to the high-pressure passage 33, the bore intersecting the passage at the chamber 34. This bore includes a pair of coaxial portions 35 and 36 of the same diameter, one at either side of the chamber 34, with a first enlarged counterbore 37 and with an adjoining enlarged counterbore 38. The bore thus communicates at its inner end with the high-pressure passage 33 and opens at its outer end to the exterior of the casing. The largest counterbore 38 is provided with an outwardly flared mouth or portion 39 which is in the form of a section of a cone on the bore axis.

The bore 35—38 receives the coupling 31, which is a second connector means in the form of a tubular elongated member having an inner elongated cylindrical end portion 40 to be received by the bore portions 35 and 36, an enlarged adjoining cylindrical portion 41 which is received by the counterbore 37, and a still further enlarged cylindrical portion or body 42 which is received in part within the larger counterbore 38. The coupling has an axial bore or passage 43 which terminates at the inner end of the coupling in a fluid-pressure-receivable area, here a blind recess 44, the passage or bore 43 thus having means at its inner end for closing the passage. The tubular wall portion of the coupling that defines the inner portion of the bore 43 is provided with a pair of ports 45 communicable with the high-pressure passage 33 via the chamber 34.

The largest portion or body 42 of the coupling has a counterbore 46 adjoining the outer end portion of the passage 43; and the junction of the bore 43 and counterbore 46 provides a circular valve seat 47. A check valve in the form of a ball 48 is adapted to move in the direction of return fluid flow to seat on, or to move in the direction of high-pressure fluid flow to be unseated from, the seat 47, and thus the ball controls opening and closing of the bore or passage 43.

The outer portion of the coupling 31 is connected to the hose 29 by any suitable means, here shown as including a tubular element 49 and retaining nut 50.

The inner portion of the tubular connector 49 provides means forming an annular shoulder at 51. Biasing means in the form of a conical compression spring 52 seats at one end against the shoulder 51 and at the other end against the ball 48, and normally functions to condition the ball 48 for seating on the seat 47.

When the coupling 31 is received by or inserted in the casing 15, as shown in Figure 2, the ball valve 48 is maintained in an unseated position by means including a slidable element in the form of a plunger 53 which is movable along an axis normal to the axis of the bore 43, or crosswise of the counterbore 46 and intersecting the seated ball 48. The plunger has an inner headed end portion 54 engageable with the ball and an outer portion engageable to be depressed by the flared mouth 39 and by the counterbore 38.

The coupling 31 is provided intermediate its ends with an annular groove 55 which is engageable with a retaining or detent means 56 normally loaded by yieldable or spring means 57. The type of releasable means illustrated is merely representative of many forms that could be used.

The casing 15 is provided with a pair of fluid-pressure sealing means 58 and 59 for respectively sealing the bore portions 35 and 36 about the reduced cylindrical portion 40 of the coupling 31. The element or plunger 53 is suitably sealed at 60.

*Operation and use*

During normal operation of the fluid-pressure system, having particular reference to the adaptation thereof to the agricultural unit illustrated and to the parts previously described, the couplings 31 and 32 are received and retained in the casing 15 in the manner in which the coupling 31 is illustrated in Figure 2. In this position, the check-valve-control member or plunger 53 is depressed by the straight portion of the counterbore 38 so that the ball 48 is maintained in an unseated position. Fluid pressure delivered from the high-pressure passage 33 enters the ports 45 and passes through the bore 43 and counterbore 46 to the hose 29. The ball 48 is thus in the path of fluid flow from the high-pressure passage 33. On the other hand, when the hose 29 is used to carry returning fluid from the cylinder, the check valve 48 is in the path of return fluid flow from its opposite side. However, the valve cannot close because of the depressed plunger 53.

When the plow is in its working position, in which case the plow bottom 22 would be considerably lower in the ground than that position illustrated in Figure 1, the piston rod 27 will be somewhat more retracted than as shown in Figure 1. The control lever 14 will, of course, be in such position as to establish a neutral condition in the distributing valve casing 15, so that no fluid under pressure is transmitted through either hose 29 or 30. Now, in the event that the plow bottom strikes an obstruction of a certain magnitude, the releasable hitch 25 will be effective to disconnect the tractor from the plow and continued forward movement of the tractor will, of course, apply sufficient tensional forces to the hoses 29 and 30 to cause the couplings 31 and 32 to be released by the releasable means (56—57 for the coupling 31). Once the coupling has been released, the sheer weight of the hoses will complete the withdrawal of the couplings from the casing. As soon as the coupling 31 (for example) moves sufficiently axially outwardly of the casing so that the plunger 53 escapes the confining action of the counterbore 38, the plunger will move outwardly as the spring 52 forces the ball 48 onto the seat 47. Thus, any fluid in the hose 29 cannot escape and run out upon the ground.

In certain operating conditions, it will be found that the hitch connection 25 will be affected by overload conditions when the plow bottom 22 is in a raised position, in which position the fluid in the anchored end of the cylinder 26 will be under considerable pressure because of the weight of the plow frame 16 and plow bottom 22. Consequently, there will be considerable pressure in the hose 30. In such case, if the coupling 32 became disconnected, there would, in the absence of the check valve 48, be no means to prevent the plow bottom and frame from lowering and thus exhausting fluid from the cylinder 26 through the hose 30 and out upon the ground. According to the present invention, however, as soon as the coupling becomes disconnected, the check valve, having a fluid-pressure-receivable area facing return fluid flow, becomes seated and prevents this loss of fluid.

After the obstructing or overload condition has been eliminated and the tractor and plow have been reconnected, the couplings 31 and 32 may be easily reconnected to the casing 15. In the event that the disconnection occurred with the plow in its working position, so that there is no appreciable pressure in either of the hoses 29 or 30, the reconnection may be easily accomplished merely by the operator manually inserting the couplings into the appropriate casing bores. As soon as the plunger 53 encounters the ramp provided by the flared mouth 39, the wedging action causes the head of the plunger to unseat the ball 48 against the bias of the spring 52. As the coupling is inserted further inwardly, the straight portion of the counterbore 38 maintains the plunger in its depressed position and thus the coupling is restored to the position of Figure 2.

In the event that the disconnection occurs under conditions in which the weight of the plow bottom causes a condition of relatively high pressure in either of the hose lines, reconnection of that particular coupling may be facilitated by use of fluid pressure transmitted from the high-pressure passage 33. In this case, the coupling 32 (for example) is inserted to the position of Figure 3, at which point the outer portion of the plunger 53 is engaged by the flared mouth 39. At this time, the ball valve 48 is under considerable pressure from the fluid trapped in the hose and depression of the plunger 53 against the pressure-loaded valve 48 could not be readily accomplished. However, according to the present invention, the ports 45 in the coupling lie within the chamber 34 and are thus in communication with the high-pressure passage 33 as shown in Figure 3. The operator may with one hand hold the coupling in position and urge the coupling toward the position of Figure 2, while with the other hand he can operate the control lever 14 so that fluid under pressure is transmitted from the passage 33 to the interior of the coupling. Inasmuch as the inner end of the coupling passage 43 is closed at the blind recess 44 to form a fluid-pressure-receivable area opposed to the fluid-pressure-receivable area afforded by the forwardly facing surface of the ball 48, the pressure between the blind recess 44 and the check valve 48 is substantially equalized, since the two areas concerned are substantially equal. That is, high pressure from the passage 33 operates to unseat the valve 48 against the pressure load in the hose by reacting in the opposite direction against the pressure-receivable area afforded by the blind recess 44, and the coupling will not be forced completely out of the casing. This balance of pressure then presents the situation in which the operator has manually to overcome only the force of the spring 52 on the ball 48. In such case, reconnection is accomplished with the same ease as in a normal situation.

*Summary*

Although the preferred form of the invention has been based on its intended use in connection with a fluid-pressure system of a particular design, it will be seen that the fundamentals of the invention have wider application. Accordingly, it is not desired to limit the spirit and scope of the invention by the exact details of construction shown and described, for obvious modifications will occur to those versed in the art.

What is claimed is:

1. A fluid-conduit coupling, comprising: an elongated member having a bore the axis of which is lengthwise of the member, said bore opening at one end of the member to the exterior of the member and communicating at the other end of the member with an enlarged counterbore; means providing a circular valve seat at the junction of the bore and counterbore; a ball valve in the counterbore seated on and unseatable from the valve seat; means within the counterbore biasing the ball valve to seated position; and a control element extending movably through the member generally normal to the counterbore axis and having a portion within the bore engageable with the ball valve and a portion outside the member for actuation to unseat the ball valve.

2. A fluid-conduit coupling, comprising: an elongated member having a cylindrical body provided with an axial bore and an enlarged counterbore, said bore and counterbore providing a circular valve seat; a ball valve within the counterbore, seated on and unseatable from the valve seat; means spaced axially from the seat within the counterbore and providing an interior annular shoulder; spring means between the shoulder and the ball valve for biasing the ball valve to seated position; and means including an actuating element slidably carried by the body on an axis crosswise of the counterbore and intersecting the seated ball, said element having an interior portion engageable with the ball and an external portion engageable from outside the body to provide for movement of the element in one direction by seating of the ball and in the opposite direction by external means to unseat the ball.

3. In a fluid-pressure system: a casing having a fluid-conducting passage opening to the exterior of the casing; a fluid-conduit coupling removably received in the passage from outside the casing, said coupling having a passage therein in communication with the casing passage; means in the coupling passage including a check valve conditioned to close the coupling passage; a depressible member projecting from the coupling and engageable with the check valve to open the check valve; and means on the casing depressing the member when the coupling is received by the casing passage, including an inclined portion for initiating depression of the member and a generally straight portion for maintaining the depression of the member.

4. In a fluid-pressure system: a casing having a fluid-conducting bore therein opening to the exterior of the casing in a larger counterbore the peripheral edge of which is flared outwardly as a portion of a cone about the bore axis; a fluid-conduit coupling axially received in and removable from the bore and counterbore, said coupling having a fluid passage therein; means in the fluid passage including a check valve and check valve seat; means in the coupling normally biasing the check valve for seating thereof; and means carried by the coupling for unseating the check valve, including a depressible element engageable with the check valve within the coupling and movably projecting from the coupling for engagement successively with the flared edge of the counterbore and then the counterbore of the casing as the coupling is axially received by the casing bore and counterbore, said flared edge providing a ramp for depressing said element and the counterbore providing a generally uniform surface for maintaining the depressed position of said element.

PAUL L. HANSON.

REFERENCES CITED

The following references are of record in the file of this patent:

UNITED STATES PATENTS

| Number | Name | Date |
|---|---|---|
| 95,528 | Smith | Oct. 5, 1869 |
| 1,493,121 | McAneny | May 6, 1924 |
| 2,337,024 | Babson | Dec. 21, 1943 |

FOREIGN PATENTS

| Number | Country | Date |
|---|---|---|
| 498,348 | Great Britain | Jan. 6, 1939 |
| 531,334 | Germany | July 29, 1930 |